(No Model.)
J. H. FLOOD.
BURNER ATTACHMENT FOR LIGHTING LAMPS.
No. 504,471. Patented Sept. 5, 1893.
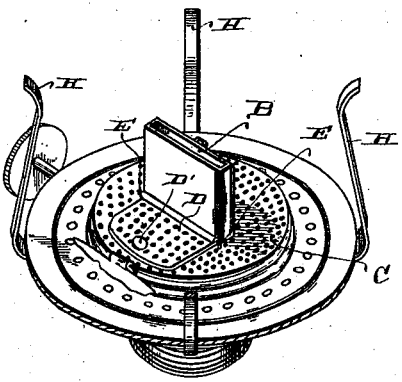
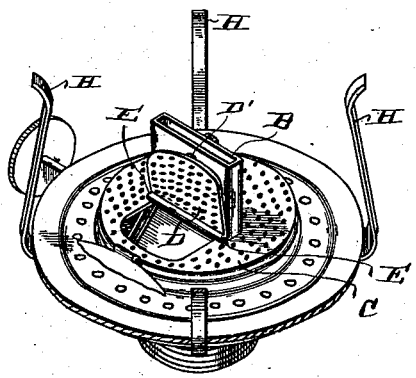
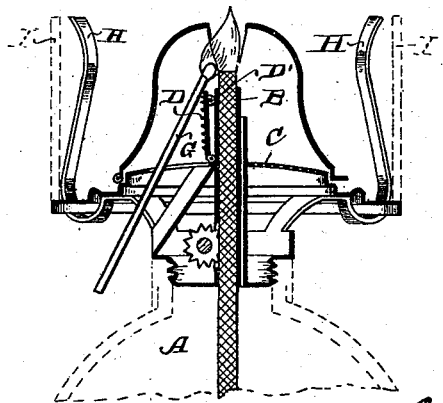
WITNESSES
INVENTOR

UNITED STATES PATENT OFFICE.

JAMES H. FLOOD, OF BRIDGEPORT, PENNSYLVANIA.

BURNER ATTACHMENT FOR LIGHTING LAMPS.

SPECIFICATION forming part of Letters Patent No. 504,471, dated September 5, 1893.

Application filed January 31, 1893. Serial No. 460,453. (No model.)

*To all whom it may concern:*

Be it known that I, JAMES H. FLOOD, a citizen of the United States, and a resident of Bridgeport, Montgomery county, State of Pennsylvania, have invented a new and useful Improvement in Burner Attachments for Lighting Lamps, of which the following is a description, reference being had to the accompanying drawings, making part hereof.

The nature of my invention will fully appear from the following specification and claim.

In the drawings:—Figure 1, is a perspective view of my device, showing the trap door closed; Fig. 2, a similar view, showing the trap open; Fig. 3, a vertical cross sectional view showing the trap open and a match or taper (ignited) to light the wick above the upper lips of the tube.

A, in dotted lines, is the body of the lamp; B the wick tube; C the perforated diaphragm, through which air is supplied to the flame to support combustion; D, a trap, forming a part of said diaphragm, through the opening of which an aperture is made to permit the insertion of a match, or taper G, to ignite the upper edge of the wick in tube B; D' a bulb or check which may be attached to the upper side of trap D or to the side of tube B (not shown) to prevent the trap D at its point of greatest elevation from reaching a perpendicular position; whereby, its restoration to place is accomplished by gravity after the withdrawal of the match or taper G.

E is the pivotal wire to which the trap D is hinged.

H H are the ordinary spring clamps to hold the glass chimney I in place. The latter, in Fig. 3, is shown outside of the clamps (in dotted lines) because its swell occurs beyond the two clamps shown in that figure.

In perforating trap D, the lower surface of the latter is roughened, whereby the ignition of the fulminated head of a match passed over it is assured. The trap D forms a part of the diaphragm C. The pushing of a lighted taper or match upward against the trap D, opens the latter and permits its lighted end to be brought into contact with the top of the wick in tube B. An unlighted match may be pushed up similarly against the under side of trap D and its end be ignited by scraping against the grated surface of the lower face of the trap. As shown in the drawings, the upper edge of the trap or door D, when open, is in a position adjacent to the upper end of the wick-tube B. Since the wick ordinarily projects above the wick-tube, it will be readily understood that the under side of the door will guide the match directly to the proper point for lighting the wick. By locating the trap or door as shown, and roughening its under side, the necessity of at first lighting the match in an exposed place is avoided. Pressing the trap upward with the head of a match, the former is opened, and the latter is ignited and guided to the wick. The office of the bulb, or check D' is shown best in Fig. 3. It is designed to prevent trap D from assuming a true perpendicular, or from resting against tube B. By this means the return of the trap to place is assured, when the lighting taper or match is withdrawn. It will be evident to the mind of any ordinarily skilled mechanic that the bulb or check D' will fulfill the function above named whether it is located on the upper face of trap D, or upon that part of tube B against which the upper edge of the trap D when raised, is disposed to impinge.

By the use of my device the lamp can be lighted without the removal of the chimney. There are various means, which will suggest themselves to the mind of an ordinarily skilled mechanic, to prevent the trap D from reaching a perpendicular position, so I will not name them here.

What I claim as new is—

The improved burner attachment for lighting lamps, comprising the wick-tube B, diaphragm C, trap D hinged adjacent to the wick-tube and of a width substantially equal to the height of the wick-tube above the hinge of the trap, the under side of the trap being roughened, and a stop to prevent raising the trap to a perpendicular position, whereby a match head may be caused to lift the trap, and be simultaneously ignited and guided to the wick, substantially as described.

JAMES H. FLOOD.

Witnesses:
A. H. HENDRICKS,
JOHN D. HART.